July 19, 1966  M. C. PFISTER  3,261,257
RADIATON PYROMETER FOR MEASURING THE COLOR TEMPERATURE
Filed Oct. 10, 1961  3 Sheets-Sheet 1

INVENTOR.
Marcel Charles Pfister
BY
Darbo, Robertson & Vandenburgh
Attys 3,261,257
RADIATION PYROMETER FOR MEASURING THE COLOR TEMPERATURE
Marcel Charles Pfister, 2 Rue de Pres, Eckbolsheim, near Strasbourg, France
Filed Oct. 10, 1961, Ser. No. 144,157
16 Claims. (Cl. 88—22.5)

This application is a continuation-in-part of my pending application Serial No. 847,432, filed October 19, 1959, now abandoned.

This invention relates to a radiation pyrometer for measuring the color temperature of an object under examination. As is well known, the color temperature of an object is understood to be the temperature which a black body had to have, in order to radiate with the same spectroscopic distribution (color) as the object under examination. It has been found that the color temperature—in contrast to the "black temperature" derived from the total radiation—coincides very well with the true temperature of the measured object. It can be derived from the radiation laws that the ratio of the radiation intensities at two different wave lengths provides an unambiguous measure for the color temperature. A radiation pyrometer is well known in the prior art wherein radiation of two different wave lengths is determined by a radiation detector, and the quotient of the signals thus obtained is ascertained by electrical means as a measure for the color temperature.

With the electrical formation of quotients, it is of great importance that the circuit elements of the quotient former are not overrun, for example when the object under examination is approached, because a wrong indication is caused thereby. The invention has for one of its objects to make such that such errors are avoided. According to the invention this is achieved in that an attenuator is provided in that portion of the path of rays common to both wave lengths and that said attenuator is under the control of the detector output signals in such a manner that the maximum intensity impinging upon the detector is maintained at least approximately constant.

With many radiation pyrometers extreme care must be maintained to have the sensing element directed exactly towards the measured object. Failure to do so will result in measurement errors. In my invention this is avoided by cyclically sweeping the point of measurement over a relatively large visual field. Thus, the pyrometer need only be directed toward the measured object with an approximation sufficiently accurate to ensure that the measured object is within the area swept by the scanning apparatus.

I have found however, that this does not fully solve the problem. Some users, knowing that there is an area of sweep and that they need not exactly align the pyrometer with the object, are careless to an extent such that the measured object is wholly or, partly out of the scanning field. As in the case of inaccurate alignment of non-scanning pyrometers, an error thereby is introduced in the measurements. In my invention there is not only a scanning apparatus to reduce the necessity for extreme accuracy of alignment of the pyrometer, but, in addition, a safety check is provided to prevent inaccuracies resulting from the measured object being outside the scanning field.

In the present invention this check is provided by an additional scanning device which covers a field, called the checking field, which is disposed within the field, i.e. measuring field, covered by the scanner of the pyrometer. If the object under examination is not detected within the checking field, the additional scanning device effects an electrical switching operation. This additional scanning means which does ont produce a temperature measured value, must "see" the object under examination (for example rolled stock) as a discontinuity within the checking field. Otherwise, for example, a pilot lamp is switched or the pyrometer is turned off.

The structure may be such that the measurement field is scanned by means of a rotating polygonal mirror with which a filter disc rotates. The radiation is directed from the polygonal mirror through a fixed mirror and through the filter disc onto a radiation detector. Checking mirrors are provided on the filter disc at the corners of the polygonal mirror, through which mirrors the checking field is scanned by means of a second radiation detector. The impulses provided by said second radiation detector energize a relay through an amplifier. The supply voltage of the measurement circuit of the apparatus is applied through make contacts of said relay so that unless the relay is in proper position the measurement circuit is inoperative.

As heretofore explained, measurements are made of the radiation at two different wave lengths. From the detector two sets of electrical impulses are obtained, one set representing the measurement of the radiation at one wave length and the second set representing the measurement of the radiation at the other wave length. To convert the series of impulses into a sensory perceptible indication the peak values of each set must be accurately determined. A calculation then is made of their relative magnitude to ascertain the temperature of the object emitting the radiation.

Difficulties arise with the evaluation of such peak values, for example, with the indication thereof by an instrument or with using them for calculating operations such as the formation of quotients. Care must be taken that no deformation and flattening of the impulses is caused by the circuit elements to which the impulses are fed. These deformations may cause a measurement error.

The invention has for its object to accurately measure such quantities appearing as peak values of impulse sequences. According to the invention, this is achieved by the features that the impulses are applied to the grid of a thyratron connected to A.C. voltage, when a positive half wave of the A.C. voltage is applied to the anode thereof; and that the A.C. current source charges a capacitor through said thyratron, the voltage of said capacitor being effective at the grid of the thyratron as a negative bias. Then the impulses fire the thyratron as long as they are able to impress on the grid a voltage positive with respect to the cathode. By the charging of the capacitor, however, the negative grid bias of the thyratron is increased, so that the impulses are no longer able to effect the firing of the thyratron. When the voltage at the capacitor decreases either by a load or by a leakage resistor, the impulses become effective again so that a new firing of the thyratron can be effected and the capacitor is recharged. Thus a voltage corresponding to the peak value of the impulses is regulated across the capacitor. With applications wherein the impulse sequence contains alternate impulses of different amplitude, two thyratrons may be provided working in phase opposition in such a manner that one thyratron has the positive half wave of the A.C. voltage applied thereto upon the occurrence of the first type of impulses and the other thyratron upon the occurrence of the other type of impulses. In order to produce a measured value for the peak value of the respective higher impulse, a common capacitor determining the grid bias may be charged through both thyratrons. It is, however, also possible, to charge separate capacitors through each thyratron in accordance with the respective peak value of the impulses. To form a quotient, a potentiometer is connected across one capacitor with the partial voltage tapped from the potentiometer being connected in opposition to the voltage of the other capacitor at a null detector. The null detector controls a servomotor for the adjustment of the potentiometer tap, so that the position of the potentiometer tap is a measure for the quotient of the impulse peak value.

These and other objects will be obvious to those skilled in the art from the following specification when taken in conjunction with the accompanying drawings, in which:

FIG. 1 schematically shows the optical path of rays in the pyrometer detector head as a side elevation;

(I) *The detector head*

Figure 5:
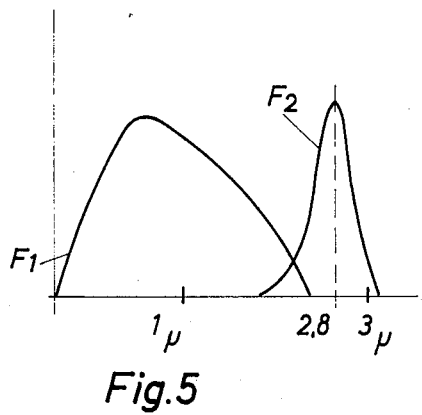
FIG. 5 shows graphs representing the transmission of the filters as a function of the wave length.

Reference numeral 1 designates a rotating filter disc to which four filters 2 are fixed. Pairs of diametrically opposite filters have the same transmission range. FIG. 5 shows the transmission characteristics of the two types of filters $F_1$ and $F_2$. It will be seen that the transmission ranges are both in the infra-red wave length range. One ($F_1$) extends more to the shorter wave lengths and is relatively wide, whereas the other one ($F_2$) comprises shorter wave lengths and is somewhat more narrow. The maxima are at 1.5 and 2.8 microns. The filter disc 1 carries a polygonal mirror 3 composed of four concave or cylinder mirrors, which are aligned with the filters 2. Brackets 4 are provided between the filters 2 to support checking mirrors 5, the function of which will be explained hereinbelow. The filter disc 1 is driven by a synchronous motor 6.

Figure 1:
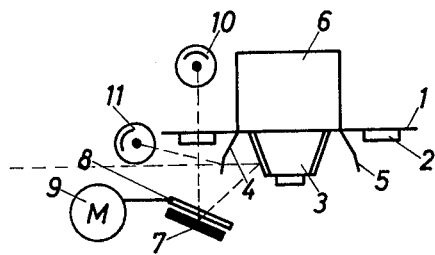

Reference numeral 7 (FIG. 1) designates a stationary plane mirror. A diaphragm 8 which can be adjusted by means of a motor 9 is positioned in front of mirror 7. Reference numerals 10 and 11 each designate a photocell or a photoconducting cell. Cells 10 and 11 are connected to impedance transducers 12 and 13, respectively, (FIG. 3) also arranged in the detector head.

At intervals, the radiation from the object whose temperature is being measured is reflected from the polygonal mirror 3 to the plane mirror 7. From plane mirror 7 the radiation is directed to the cell 10 which is the measuring cell. Between plane mirror 7 and cell 10 the radiation will pass through one of the filters, $F_1$ or $F_2$. In intervening intervals the radiation strikes the cell 11 (the field checking cell) by reflection from the mirrors 5. Provision is made that an object under examination which is detected by the checking mirrors 5 and provides impulses from the cell 11 is at any rate also completely detected by the polygonal mirror 3 and the measuring cell. Thus the scanning field of cell 11 lies within the scanning field of cell 10.

(II) *The control circuit*

As disc 1 rotates the beam of radiation passes alternately through filters $F_1$ and $F_2$. Upon striking measuring photocell 10, the radiation from filter $F_1$ produces one electrical impulse. A second electrical impulse is produced when the beam which traverses filter $F_2$ strikes cell 10. Thus, cell 10 provides a series of alternate electrical impulses, as shown by oscillogram 14 of FIGURE 3, which are function of the radiation passing through filters $F_1$ and $F_2$. These impulses are fed to a preamplifier 15 comprising a pentode 16 and a double triode 17. The impulses are applied to the control grids of the double triode, which grids are connected together.

Figure 3:
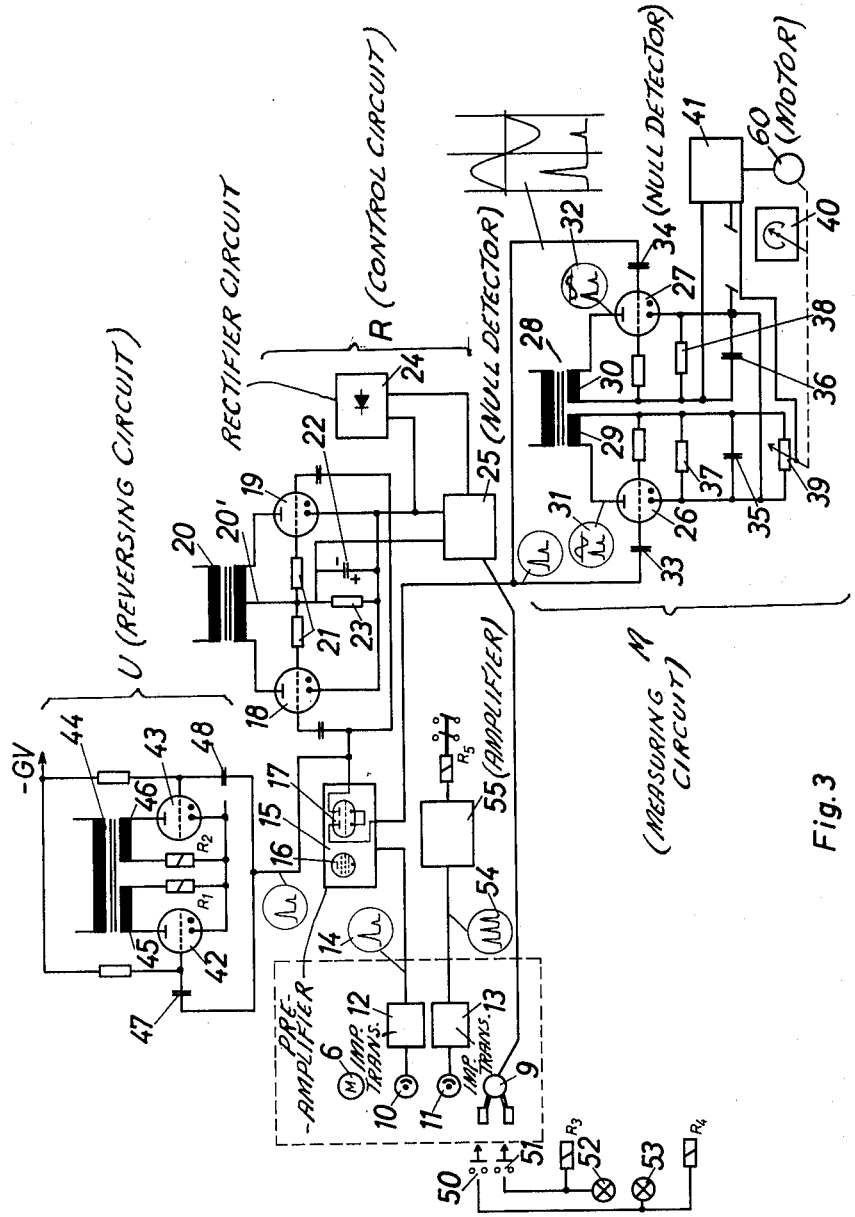
FIG. 3 shows schematically the wiring diagram of a pyrometer.

From one half of the double triode 17 the impulses are fed to a control stage which is generally designated by R in FIG. 3. Control stage or circuit R acts to control the diaphragm 8 by means of motor 9. Through the diaphragm it controls the intensity of the radiation reflected to cell 10 to the end that the maximum electrical impulse amplitude is maintained substantially constant. This prevents overrunning in the measursing circuit.

The control circuit R comprises two thyratrons 18 and 19, respectively, which are supplied in phase opposition from a power transformer having a dual secondary defined by center tap 20′. The grids of the thyratrons 18 and 19 are connected to the tap 20′ through resistors 21. A capacitor 22 connects to the two cathodes of the thyratrons to center tap 20′ and resistors 21. Connected in parallel to the capacitor 22 is a leakage resistor 23. The impulses from half of dual triode 17 are applied to the grids of thyratrons 18 and 19 through coupling condensers. The voltage across the capacitor 22 is fed to a null detector 25 along with a stabilized reference voltage provided by a rectifier circuit 24. Null detector 25 controls motor 9.

Figure 2:
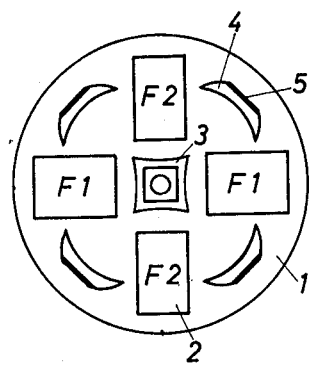
FIG. 2 is a bottom view of the mirror and filter rotor of FIGURE 1.

The mirror structure (FIGS. 1 and 2) is so designed that during one half wave of the A.C. current the first ($F_1$–) impulse is obtained and during the other half wave the second ($F_2$–) impulse appears. During the first half wave, however, thyratron 18 is operative, whereas thyratron 19 is operative during the other half wave.

Thus the $F_1$– impulse fires the thyratron 18, which, of course, is extinguished at the next half wave. By this means the capacitor 22 is charged with a D.C. voltage, namely by at least a portion of one half wave from the secondary of transformer 20 through the thyratron acting as a rectifier. The charging of capacitor 22 impresses an increasing negative bias on the grid of the thyratron 18 with respect to the cathode thereof. As long as the $F_1$– impulse is larger than this bias, the thyratron fires. As soon as, however, the capacitor is charged to a D.C. voltage corresponding to the peak value of the impulses, the thyratron will not fire and the capacitor 22 is not additionally charged. Through the leakage resistor 23 a slow discharging of capacitor 22 takes place, as well as by any other load. As soon as the voltage across the capacitor decreases below the impulse amplitude, the thyratron again fires as has been described above. Thus a D.C. voltage is regulated across the capacitor 22 which voltage corresponds to the peak value of the impulses.

It has been assumed, here, that the $F_1$– impulse is the larger one. Capacitor 22 applies a negative grid bias to the grid of thyratron 19 to the same extent that it does to thyratron 18, since the two thyratrons are connected symmetrically to the capacitor. As long as impulse $F_1$– is greater than $F_2$– thyratron 18 will maintain the voltage across the capacitor 22 sufficiently high that thyratron 19 will not be fired by the $F_2$– impulse. Should the $F_2$– impulses be of a greater magnitude than the $F_1$–, the reverse situation will exist. Namely, the $F_2$– impulses will control thyratron 19 to charge capacitor 22 to a voltage level sufficiently high that the $F_1$– impulses will be insufficient to overcome the bias and fire thyratron 18. Thus the regulated voltage across capacitor 22 is only determined by the larger impulses.

The diaphragm 8 is adjusted by motor 9, until the voltage across the capacitor 22 has reached a selected value determined by the stabilized reference voltage. If the voltage across capacitor 22 becomes too large as compared to the reference voltage the diaphragm is closed to reduce the amount of radiation impinging on cell 10. Conversely, should the capacitor voltage drop the diaphragm is opened. Thereby stabilized conditions are obtained in the measuring circuit and an overrunning of circuit elements is avoided to the end that greater accuracy and reliability are achieved.

(III) *The measuring circuit*

From the two impulses provided by the cell 10, the measuring circuit forms a measured value corresponding to the ratio of the peak values of these impulses. This must, however, be effected in such a manner, that the impulses cannot be deformed or flattened by a load. The impulses are tapped from the second half of the double triode 17 so that no interaction between control circuit R and measuring circuit M is obtained.

Similar to the control circuit, the measuring circuit contains two thyratrons 26 and 27, which are supplied with current in phase opposition from a line transformer 28 having a dual secondary comprising two separated secondary windings 29 and 30, respectively. Through the rotation of disc 1 by synchronous motor 6 supplied by the same alternating current that transformer 28 is supplied, the $F_1$– impulses occur at the same time that a positive half wave from secondary winding 29 is applied to thyratron, and the $F_2$– impulses occur at the same time that a positive half wave is applied to thyratron 27 by secondary winding 30. Of course, the positive half waves from secondaries 29 and 30 are 180° out of phase with each other, i.e. the positive half wave of one coincides with the negative half wave of the other. The impulses are applied to the grids of the thyratrons 26, 27 through coupling condensers 33 and 34, respectively. The $F_1$– impulse fires the thyratrons 26. When the $F_2$– impulse appears, thyratron 26 has a negative anode voltage and thus is not affected by this impulse. The $F_2$– impulse fires thyratron 27, which, again, is not affected by the $F_1$– impulse.

Upon firing of the thyratrons 26, 27 capacitors 35 and 36 are charged from the transformer windings 29, 30 through the thyratrons acting as rectifiers in a similar manner as in the control circuit. The capacitors provide a negative grid bias, which completely blocks the thyratron as soon as its charge is as large as the peak value of the positive impulse applied to the grid. Here, however, the circuits of the thyratrons are electrically separated from each other. The separate bias capacitors 35 and 36, between the grid and the cathode of each of thyratrons 26 and 27 respectively have leakage resistors 37 and 38, respectively connected in parallel thereto.

The capacitors 35 and 36 are charged to voltages corresponding to the peak values of the respective impulses in the manner described in connection with capacitor 22 of control circuit R, and these voltages are automatically regulated and maintained.

For the purpose of forming the quotient, a potentiometer 39 is connected in parallel to the capacitor 35, which is coupled with an indicating device 40. The voltage tapped from the potentiometer 39 is opposed to the voltage across the capacitor 36 at a null detector 41. The latter controls a motor 60 which adjusts the potentiometer 39 and thereby the indicating device 40, until the fraction of the voltage of capacitor 35 tapped from the potentiometer 39 is equal to the voltage of capacitor 36. Then the potentiometer position is a measure for the ratio of the capacitor voltages and thus for the ratio of the impulse amplitudes. This ratio, on the other hand, is a measure for the color temperature of the object under examination, and, therefore, the indicating device 40 may be calibrated directly in degrees Kelvin or centigrade, for example. The indication is independent from the absolute amplitude of the impulses and thus from the distance of the detector head from the object under examination. Overrunning of the triode 17, for example, is avoided by the control circuit R, which overrunning would, of course, cause a wrong indication.

*(IV) The reversing circuit*

The measuring circuit described above makes it necessary that the impulse effective on the thyratron 26 is the larger one. Now, of course, the $F_1$– impulse is not necessarily the larger one, but instead the $F_2$– impulse may be larger, if the object under examination is cooler. In order to make provision for this case, a reversing circuit U (FIG. 3) has been provided in combination with an appropriate relay circuitry (FIG. 4), whereby the polarity of the primary winding of the transformer 28 can be reversed. By reversing the polarity of the primary winding the phases of the anode voltages of thyratrons 26, 27 are reversed, and thyratron 27 is fired by the $F_1$– impulse and thyratron 26 by the $F_2$– impulse.

This reversing circuit U also comprises two thyratrons 42, 43 which are supplied with current in phase opposition from a line transformer 44 having two separated secondary windings 45 and 46, respectively. The two impulses are applied to the grids of the thyratrons 42 and 43 through coupling capacitors 47 and 48, respectively. In addition, a negative stabilized grid bias is applied to the grids. The anode voltage of the thyratron 42 is positive when the $F_1$– impulse appears. The anode voltage of the thyratron 43 is positive when the $F_2$– impulse appears.

The grid bias is of such a value that, as a rule, a thyratron can be fired only by the respective larger impulse, whereas the smaller one is suppressed. This is made possible, because the amplitude of this larger impulse is maintained constant by means of the control circuit R and the diaphragm 8. If the $F_1$– impulse is the larger one, thyratron 42 is fired; while if the $F_2$– impulse is the larger one, thyratron 43 is fired. Thereby a relay $R_1$ or $R_2$, respectively, is energized.

Figure 4:
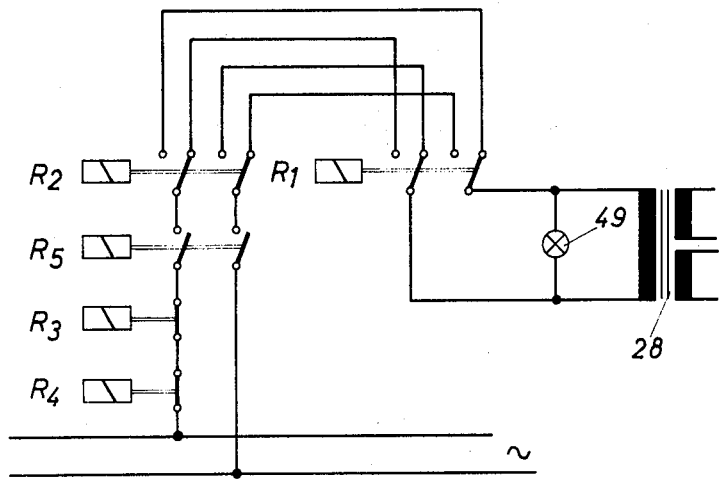
FIG. 4 shows the relay circuit in the power supply for the measuring circuit of the pyrometer.

The circuit of the relays $R_1$ and $R_2$ is shown in FIG. 4. As can be seen therefrom, the relays $R_1$ and $R_2$ are switching relays. The primary winding of the transformer 28 is connected to the two moving contacts of the relay $R_1$ whereas the two moving contacts of the relay $R_2$ are connected to the supply line. The normally closed contacts of one relay ($R_1$ in the FIGURE 4 illustration) are connected to the normally open contacts of the other relay ($R_2$ in the illustrated embodiment). With neither (or both) of the relays energized transformer 28 will not be supplied with power. If either relay is alone energized transformer 28 also will be energized, but the phase will be dependent upon which relay is energized. Energizing relay $R_1$ will supply transformer 28 at one phase and energizing relay $R_2$ will reverse the polarity (and phase) of the primary connections of transformer 28. As previously explained this will result in thyratron 26 always receiving a positive anode voltage in synchronism with the larger of the two impulses being applied to its grid.

It might now happen that the detector head is brought too near to the object under examination, so that the diaphragm 8 will not be sufficient to limit the amplitude of the larger impulse to the selected value. The diaphragm 8 cannot be closed to an unlimited extent, because then the relative changes in intensity and measured value caused by even extremely small diaphragm adjustments become too large and the regulation loop is unstable. Regulation oscillations ("pumping") of the diaphragm will result.

The reversing circuit prevents the user from operating the detector head so close to the object under examination that such instability will occur without his being aware of it. When the head and object are unreasonably close together both the larger and the smaller of the impulses ($F_1$ and $F_2$ as the case may be) are sufficiently large that they will overcome the grid bias on the thyratrons 42 and 43. In other words, the smaller impulse (as well as the larger) is sufficiently great to fire its respective thyratron. With both of thyratrons 42 and 43 being fired, both of relays $R_1$ and $R_2$ are energized and their moveable contacts picked up. As can be seen in FIGURE 4, the energizing both relays $R_1$ and $R_2$ will disconnect transformer 28 from the power supply line. The measuring circuit then is inoperative. Pilot light 49 also will be de-energized to advise the operator.

De-energizing transformer 28 also occurs if the detector head is too distant from the object under examination. In that event neither of the two impulses is sufficient to fire its respective thyratron. Both of the relays are de-energized with pilot light 49 and transformer 28 being isolated from the power supply line.

*(V) Check means*

An additional safety is provided by the feature that limit switches 50, 51 are positioned on the diaphragm to be closed when the diaphragm has reached its largest or its smallest aperture, and, therefore, is no longer able to accommodate to the radiation intensity of the object under examination. Relays $R_3$ and $R_4$ are connected to be energized by switches 50 and 51, respectively. The normally closed contacts of relays $R_3$ and $R_4$ are in series in one side of the connection between the moveable contacts of the relay $R_2$ and the power supply line as can be seen in FIG. 4. They serve as disconnect switches to interrupt the current supply to transformer 28 when the relays pull up. Pilot lamps 52 and 53 (FIGURE 3) are connected in parallel with relays $R_3$ and $R_4$, respectively. The lamps indicate whether the radiation is too strong or too weak, in other words, whether the detector head must be approached to the object under examination or removed therefrom.

A further precautionary control of the instrument is effected by the checking cell 11. As has already been described, the optical set-up is such that the object under examination always is completely detected by the polygonal mirror 3 and cell 10, if it can be detected by the mirrors 5 and the cell 11. When the object whose temperature is to be measured falls within the field scanned by cell 11, cell 11 produces impulses as shown by the oscillogram 54 (FIG. 3). These impulses 54 through an amplifier 55 energize a relay $R_5$, as seen in FIGURE 4, the normally open contacts of relay $R_5$ are in series in the two connections between the power supply line and the moveable contacts of relay $R_2$. When the object under examination no longer is completely detected by cell 11 and therefore the impulses 54 are not obtained, relay $R_5$ is de-energized and the measuring circuit consequently is switched off.

By these means a far-reaching protection against wrong measurement is achieved. By the diaphragm 8 the maximum radiation reaching cell 10 is regulated, so that an overrunning of circuit elements and wrong measurements resulting therefrom are avoided. In addition, the measuring circuit is switched off:

(1) If the diaphragm 8 can no longer fulfill this regulating function ($R_3$, $R_4$);

(2) If the change-over circuit U does not operate perfectly ($R_1$, $R_2$); and (3) If the object under examination is not completely detected ($R_5$).

In all cases, the operativeness or inoperativeness of the instrument is indicated by a pilot lamp 49. In case (1), pilot lights 52 or 53 additionally indicate whether the radiation is too strong or too weak, so that this can be corrected by appropriate selection of the distance. By the manner of forming quotients described, it is made sure that really the unadulterated peak values of the measured impulses are used for the formation of the quotients and no deformation of the impulses is effected by a load. The detector head having an axis of sensitivity oscillating or periodically sweeping in one direction makes an accurate aligning of the instrument unnecessary, and the peak value of the impulse corresponds to the hottest spot of the object under examination.

The foregoing description of a specific embodiment is for the purpose of complying with 35 U.S.C. 112 and should not be construed as imposing unnecessary limitations on the appended claims inasmuch as modifications and variations will be apparent to those skilled in the art or subsequently devised by them. For example, a detector head optical and filter structure of the type illustrated and described in my co-pending application Serial No. 847,432, filed October 19, 1959, now abandoned, the disclosure of which is incorporated by reference, could be employed. In place of the thyratrons functioning as controlled rectifiers, there could be employed the solid state controlled rectifiers.

What I claim is:

1. A radiation pyrometer for measuring the color temperature of a radiating body by determining the ratio of the intensities of the beam at two different wave lengths which comprises optical scanning means to sweep a viewed spot across a visual field including said body with said spot always being smaller than a swept dimension of the body, a pair of optical filters each having a different wave length transmission range, said filters and said scanning means being so arranged that said scanning means directs the beam from the viewed spot alternately through said filters, radiation detecting means and means for directing the beam passing through both of said filters onto said radiation detecting means to produce electrical pulses having a characteristic which varies in proportion to the variation in intensity of the radiation as the viewed spot traverses the visual field which characteristic varies from a minimum to a peak value as said body is traversed and then again to a minimum with the radiation passing through one filter and varies between minimums and a second peak value with the radiation passing through the other filter, and electrical quotient computing means connected to said radiation detecting means for determining the ratio of said peak values to determine the relative intensities of the beams emanating from said filters to indicate the maximum color temperature of said body.

2. A radiation pyrometer for measuring the color temperature of an object including: a detector head having a radiation detector means to produce two electrical signals which respectively are functions of the radiation of the object at two different wave lengths, means to direct a beam of radiation from said object on said detector means, an adjustable diaphragm intersecting said beam between said object and said detector means to control the amount of radiation from said object directed on said detector means, said diaphragm having two limit switches actuated respectively at the operating minimum and maximum diaphragm openings; control means connected to said detector means and to said diaphragm to maintain the maximum strength of said signals substantially constant; and measuring means connected to said detector means to compute a quotient as a function of the strength of the signals, said measuring means being connected to said limit switches to be switched off upon the actuation of either of said limit switches.

3. A pyrometer as set forth in claim 2, wherein the pyrometer includes signalling means connected to said switches to indicate that the diaphragm has reached its operating limit.

4. A radiation pyrometer for measuring the color temperature of an object including: a first scanning means including a radiation detector to scan a first field and produce electrical signals when said object is within said field; a second scanning means including a radiation detector to scan a second field wholly within said first field and to produce electrical signals which are functions of the radiation of the object; measuring means connected to the second scanning means to indicate the radiation of the object; and means connected to the first scanning means to be actuated when said object is not within said first field to signify that fact and thus avoid an inaccurate reading being taken.

5. A radiation pyrometer for measuring the color temperature of an object including: a first scanning means including a radiation detector to scan a first field and produce electrical signals when said object is within said field; a second scanning means including a radiation detector to scan a second field wholly within said first field and to produce two electrical signals the strength of which respectively are functions of the radiation of the object at two different wave lengths; measuring means connected to the second scanning means to compute a quotient of the relative strength of the two signals to indicate color temperature of the object; and switching means connected to the first scanning means and to said measuring means to disable said measuring means when said object is not within said first field.

6. A radiation pyrometer for measuring the color temperature of an object including: a detector head having a radiation detector means to produce two electrical signals alternately at substantially a given frequency and which are of an amplitude which respectively are functions of the radiation of the object at two different wave lengths; and measuring means including two controlled rectifiers operating in phase opposition synchronously with said frequency, each of said rectifiers having a control element, said detector means being connected to said control elements to apply said signals to said control elements, whereby one of said rectifiers will be operated by one of said signals and the other rectifiers by the other of the signals, capacitors connected respectively to each of said rectifiers to be charged when said rectifiers respectively conduct, said capacitors being connected to the control elements of the respective rectifiers to bias the rectifiers toward cut off, means connected to the capacitors to gradually dissipate the charge on the capacitors, and means connected to the capacitors to indicate the relative strength of the charges thereon.

7. A radiation pyrometer for measuring the color temperature of an object including: a detector head having a radiation detector means to produce two electrical signals alternately at substantially a given frequency and which are of an amplitude which respectively are functions of the radiation of the object at two different wave lengths; measuring means including two controlled rectifiers operating in phase opposition synchronously with said frequency, each of said rectifiers having a control element, said detector means being connected to said control elements to apply said signals to said control elements, whereby one of said rectifiers will be operated by one of said signals and the other rectifier by the other of the signals, capacitors connected respectively to each of said rectifiers to be charged when said rectifiers respectively conduct, said capacitors being connected to the control elements of the respective rectifiers to bias the rectifiers toward cut off, means connected to the capacitors to gradually dissipate the charge on the capacitors; reversing means connected to said measuring means so that whichever is the larger of said signals will actuate a predetermined one of said rectifiers and the smaller of the signals will actuate the other of the rectifiers; a potentiometer connected across the capacitor of said predetermined one rectifier; and null detector means connected to said potentiometer and to the capacitor of said other rectifier to adjust the potentiometer setting equal to the charge of the latter capacitor.

8. An apparatus for use in a radiation pyrometer for measuring the color temperature of an object and adapted to be connected to a source of alternating electric current, said apparatus including: a detector head including a synchronous motor connected to said source, a segmental mirror attached to said motor to be rotated thereby at a given speed, a radiation detector to produce electrical signals, a pair of optical filters of different wave lengths, and an optical system to reflect the object's radiation from said mirror onto said detector with said radiation alternately passing through one and then the other of said filters before reaching said detector, whereby the detector will produce a sequential series of electrical signals, every other signal of the series being a function of the radiation traversing a first of the filters and the intermediate signals being a function of the radiation traversing the other filter, with said signals being pulsed at a frequency corresponding to the alternations of said electric current; and a pair of vacuum tubes, each having a grid connected to said detector to receive said signals, said vacuum tubes being connected to said source to alternately apply a conducting inducing potential to said tubes at said frequency, whereby one of said signals only can affect the operation of one tube and the other of said signals only can affect the operation of the other tube.

9. An apparatus for use in a radiation pyrometer for measuring the color temperature of an object and adapted to be connected to a source of alternating electric current, said apparatus including: a detector head including a synchronous motor connected to said source, a segmental mirror attached to said motor to be rotated thereby at a given speed, a radiation detector to produce electrical signals, a pair of optical filters of different wave lengths, and an optical system to reflect the object's radiation from said mirror onto said detector with said radiation alternately passing through one and then the other of said filters before reaching said detector, whereby the detector will produce a sequential series of electrical signals, every other signal of the series being a function of the radiation traversing a first of the filters and the intermediate signals being a function of the radiation traversing the other filter, with said signals being pulsed at a frequency corresponding to the alternations of said electric current; a transformer connected to said source and having a dual secondary; a first controlled rectifier connected to one-half of said dual secondary to apply a conduction inducing voltage thereto during one-half cycle only, whereby said signals are effective on said one rectifier only during said one-half cycle; and a second controlled rectifier connected to the other half of said dual secondary to apply a conduction inducing voltage thereto during the other half cycle only, whereby said signals are effective on said second rectifier only during said other half cycle; each rectifier having a control element connected to said detector whereby the timing of the signals and that of the conduction inducing voltages will result in one rectifier being operated by one signal and the other rectifier by the other signal.

10. A radiation pyrometer for measuring the color temperature of an object and adapted to be connected to a source of alternating electric current, said pyrometer including; a detector head including a synchronous motor connected to said source, a segmental mirror attached to said motor to be rotated thereby at a given speed, a radiation detector to produce electrical signals, a pair of optical filters of different wave lengths, an optical system to reflect the object's radiation from said mirror onto said detector with said radiation alternately passing through one and then the other of said filters before reaching said detector, whereby the detector will scan a first field and produce a sequential series of electrical signals, every other signal of the series being a function of the radiation traversing a first of the filters and the intermediate signals being a function of the radiation traversing the other filter, with said signals being pulsed at a frequency corresponding to the alternations of said electric current, and an adjustable diaphragm intersecting said radiation between said object and said detector means to control the amount of radiation from said object directed on said detector, said diaphragm having two limit switches actuated respectively at the operating minimum and maximum diaphragm openings; control means connected to said detector and to said diaphragm means to maintain the maximum strength of said signals substantially constant, said control means including two controlled rectifiers operating in phase opposition synchronously with the alternations of said electric current, a biasing capacitor connected to said two rectifiers to be changed thereby, a device to provide a stabilized reference voltage, a servomotor connected to said diaphragm, a resistance in parallel with said capacitor to slowly dissipate the charge on the capacitor, and a null detector connected to said capacitor, to said device and to said servomotor to adjust said diaphragm to maintain the charge on said capacitor at a given value in relation to said reference voltage; measuring means including two controlled rectifiers operating in phase opposition synchronously with said alternations, each of said rectifiers having a control element connected to said detector means to apply said signals to said control elements, whereby one of said rectifiers will be operated by one of said signals and the other rectifiers by the other of the signals, capacitors connected respectively to each of said rectifiers to be charged when said rectifiers respectively conduct, said capacitors being connected to the control elements of the respective rectifiers to bias the rectifiers toward cut off, means connected to the capacitors to gradually dissipate the charge on the capacitors, said measuring means being connected to said limit switches to be disabled upon either of said limit switches being actuated; phase reversing means connecting the measuring means and the source so that whichever is the larger of said signals will actuate a predetermined one of said rectifiers and the smaller of the signals will actuate the other of the rectifiers; a potentiometer connected across the capacitor of said predetermined one rectifier; null detector means connected to said potentiometer and to the capacitor of said other rectifier to adjust the potentiometer setting equal to the charge of the latter capacitor; a second scanning means to scan a second field within which said first field is fully enclosed; and switching means connected to the second scanning means to be actuated when said object is not within said second field and to said measuring means to disable said measuring means when said object is not within said second field.

11. A radiation pyrometer according to claim 1, wherein said quotient computing means includes two phase controlled amplifiers, said amplifiers being connected to operate alternately in phase with the scanning means with one amplifier operating coincident with said beam passing through one filter and the other amplifier operating coincident with the beam passing through the other filter.

12. A radiation pyrometer according to claim 11, wherein one of said peak values is greater than the second peak value and one of the amplifiers is operated in phase with the occurrence of said one peak value and the other amplifier is operated in phase with the occurrence of the second peak value, and the phase controlled amplifiers each produce a voltage output corresponding to said characteristic whereby the voltage output of the one amplifier has a maximum corresponding to said one peak value and the voltage output of the other amplifier has a maximum corresponding to said second peak value, said quotient computing means including a nulling amplifier means with an adjustable electric balancing device, said nulling amplifier means being connected to the two phase controlled amplifiers with the balancing device in the output circuit of said one amplifier to adjust the balancing device to a setting at which a decrement of the volage output of the one amplifier is equal to the voltage output of the other amplifier, whereby the setting of the balancing device serves as a measure for the temperature of said body.

13. A radiation pyrometer according to claim 1, including variable means intersecting said beam between said body and said radiation detecting means, and control means connected to said radiation detecting means and to said variable means to maintain the maximum strenght of said pulses substantially constant.

14. A radiation pyrometer according to claim 13, wherein said scanning means operates at a given frequency and control means includes two controlled rectifiers operating in phase opposition synchronously with said frequency, and a biasing capacitor for said rectifiers, connected thereto and charged by said rectifiers whereby the rectifiers are biased to a voltage proportional to the maximum charging voltage supplied by said rectifiers, said control means adjusting said variable means as a function of the voltage across said capacitor.

15. A radiation pyrometer according to claim 13, wherein said scanning means operates at a given frequency, and said variable means includes an adjustable diaphragm, said control means includes a device to provide a stabilized reference voltage, a servomotor connector to said diaphragm to adjust the same, two controlled rectifiers operating in phase opposition synchronously with said frequency and connected to said detecting means to receive said signals, a biasing capacitor for said rectifiers, connected thereto and charged by said rectifiers, a resistance in parallel with said capacitor to slowly dissipate the charge on the capacitor, and a null detector connected to said capacitor, to said device and to said servomotor to adjust said diaphragm to maintain the charge on said capacitor at a given value in relation to said reference voltage.

16. A pyrometer as set forth in claim 1, wherein said computing means includes a pair of phase controlled rectifiers, one rectifier operated during one part of the cycle and the other operated during the second part of the cycle, said pyrometer including phase reversing means operatively connected to said computing means to reverse the timing of the operation of said rectifiers whereby said one rectifier operates at the second part of the cycle and said other rectifier operates at said one part of the cycle, whereby the maximum of the peak values always can be used for the operation of a selected one of the rectifiers.

References Cited by the Examiner

UNITED STATES PATENTS

| | | | |
|---|---|---|---|
| 2,237,713 | 4/1941 | Russell | 88—22.5 |
| 2,528,924 | 11/1950 | Vassy | 88—14 |
| 2,710,559 | 6/1955 | Heitmuller et al. | 88—22.5 |
| 2,823,351 | 2/1958 | Page | 324—99 |
| 2,823,800 | 2/1958 | Bliss. | |
| 2,904,753 | 9/1959 | Konrad | 324—99 |
| 2,927,502 | 3/1960 | Watrous | 88—22.5 |
| 2,984,148 | 5/1961 | Herscher et al. | 88—14 |
| 3,044,349 | 7/1962 | Watrous | 88—22.5 |

JEWELL H. PEDERSEN, *Primary Examiner.*

EMIL G. ANDERSON, *Examiner.*

T. L. HUDSON, *Assistant Examiner.*